J. C. WISE.
TIRE.
APPLICATION FILED JAN. 29, 1919.

1,330,732.

Patented Feb. 10, 1920.

Inventor,
Joseph C. Wise,

By

His Attorney.

UNITED STATES PATENT OFFICE.

JOSEPH C. WISE, OF LOS ANGELES, CALIFORNIA.

TIRE.

1,330,732. Specification of Letters Patent. Patented Feb. 10, 1920.

Application filed January 29, 1919. Serial No. 273,713.

*To all whom it may concern:*

Be it known that I, JOSEPH C. WISE, a citizen of the United States, residing at Los Angeles, in the county of Los Angeles and State of California, have invented new and useful Improvements in Tires, of which the following is a specification.

This invention relates to tires and has for its object to provide improvements in vehicle tires whereby the length of life of the casings or shoes of the tires may be increased, or, whereby casings or shoes so worn or impaired in effectiveness as ordinarily to be useless for further service may be continued in service for a material length of time. In carrying the invention into effect, I provide a sheath or liner between the shoe or casing and the air tube, and in accordance with the particular features of my invention I increase the thickness of this sheath or liner in the zones of the same in which the breaking, bends and strains occur in service, and I likewise provide non-skid means between such sheath and the shoe or casing at such thickened portions of the sheath. Likewise I provide a sealing flap which is applied to such sheath at the opposed edges of the same, adjacent to the bead portions of the shoe or casing, and which opposes "blow-out" tendencies at such bead portions, and likewise completes a continuous transverse sectional formation of the sheath. This sealing strip is firmly cemented in place, being introduced loosely within the sheath and finally cemented in place, or caused to adhere to the side edge portions of the sheath, under pressure incident to inflation of the tire, and the heat generated thereby, and which produces adhesiveness in the cement or other similar substance upon such strip.

In connection with the objects above mentioned, the invention has for further objects the provision of an improved tire structure which will be superior in point of relative simplicity and inexpensiveness, taken in conjunction with reliability and positiveness in operation, convenience in installation or removal, and which will be generally superior in efficiency and serviceability.

The invention consists in the novel provision, formation, construction, combination, association and interrelation and relative arrangement of parts, members and features, all as hereinafter described, shown in the drawing, and finally pointed out in claims.

In the drawing.

Corresponding parts in all the figures are designated by the same reference characters.

Figure 1:
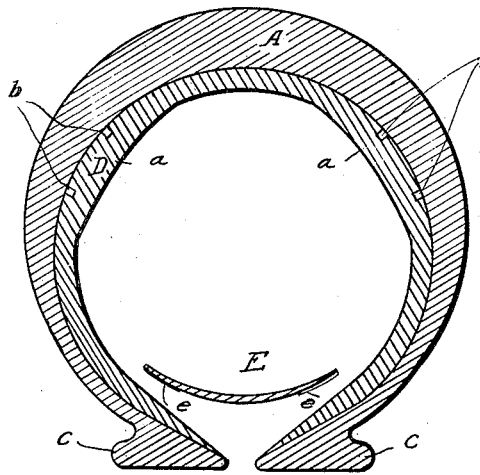
Figure 1 is a transverse sectional view of a pneumatic vehicle tire embodying the invention, the improved sheath being in position within the casing, and the sealing strip being shown as slightly spaced from the sheath prior to ultimate connection of the tube, the inner tube being omitted.
Figure 2:
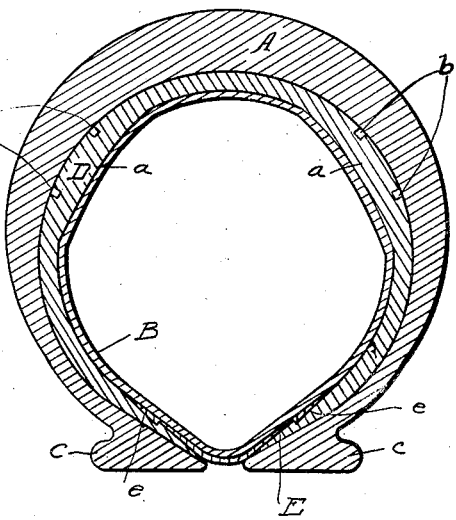
Fig. 2 is a view similar to Fig. 1, the sealing strip being shown as adhesively connected with the sheath, and the inner tube being shown as disposed within the tubular enveloping structure composite of such sheath and sealing strip; and, Fig. 3 is a side view of the construction shown in Fig. 2 and the parts being broken away in order to expose the several elements of the complete tire.
Figure 3:
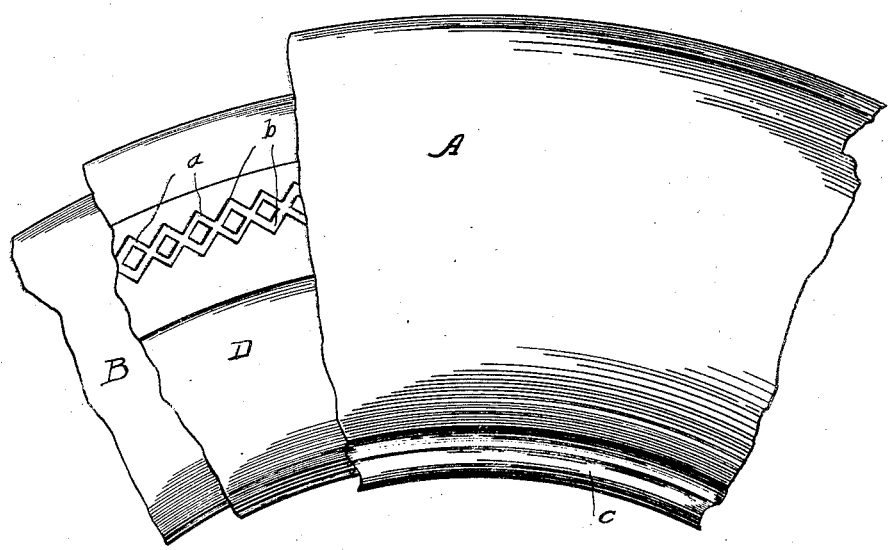

Referring with particularity to the drawing, A designates the shoe or casing, and B designates the inner or air tube of a pneumatic vehicle tire, such casing having the usual side edge beads C whereby the entirety may be secured to the rim of a wheel. D designates a sheath interposed between the casing and the inner tube, and formed to fit and conform to the contour of the inner wall of the shoe or casing and having relatively thickened portions *a* arranged in opposed relation, and at those portions of such sheath where the destructive or injurious bending or flexing strains will occur resulting upon tractive engagement of the tire with the roadway. These portions *a* are likewise provided with non-skid formations *b*, of any particular design or delineation, the drawing illustrating the same as of intersecting zigzag channels extending circumferentially of the sheath D in such thickened zone *a*. These non-skid formations co-engage with the inner surface of the casing and prevent creep of such sheath within the casing, thus preventing a wearing frictional play of such sheath between the inner tube B and the casing A.

E is a sealing flap or strip which might be termed as "full-floating" in its initial state; that is, it is introduced within the sheath D in loose association therewith, means *e*, preferably adhesive material, being applied to the marginal portions thereof at the faces presented toward the side edge regions of the sheath D.

When the tube B is inflated the heat incident to such inflation tends to soften the adhesive material E, which may consist of rubber cement, and the pressure of inflation forces such strip or flap E against the edge zones of the sheath D and causes such sheath firmly and positively to adhere to the sheath. It results that a complete tubular formation is effected, surrounding the inner tube, and between it and the casing, which more effectively protects the inner tube, prevents its wearing upon the rim of the wheel and upon the beads C of the tire, and likewise opposes any tendency of the inner tube to blow-out under and around the beads. When it is desired to remove the inner tube, the strip E may be ripped loose from the sheath at one or both sides so as to accommodate such removal.

The strip E is preferably composed of canvas or other textile material, and the sheath D is preferably built up of layers of rubber and textile fabric, in simulation of the construction of a casing carcass.

It has been found in practice that a tire organized in accordance with the invention is of much greater length of life than without such features, and a given casing may be used or worn right down to the last layer or thickness of material adjacent to the sheath D, before such carcass needs be discarded.

The relatively thickened portions $a$ of the sheath D provide the proper strength and durability at the points of the tire where the greatest flexion takes place in service, that is, at the points where the tendency to break down and fail is the greatest; and the anti-skid feature $b$ eliminates any objectionable factor of friction which otherwise might produce objectionable wear upon the casing and inner tube.

It is manifest that many changes and modifications may be made in practising the invention, all with respect to the showing of the drawing and the foregoing description and statement, without departing from the true spirit of the invention.

Having thus disclosed my invention, I claim and desire to secure by Letters Patent:

A flexible reinforcing sheath adapted for insertion within the outer casing of a pneumatic tire, said sheath being substantially U-shaped in cross section and extending continuously across the tread portion and around the sides of the casing substantially to the slit at the base thereof, the outer and inner faces of the sheath being substantially continuous and the sheath being formed at opposite sides thereof with peripherally extending thickened portions which are located where the greatest tire flexion is produced in traction, the outer face of the sheath being formed with depressions which are arranged in non-skid configuration and tend to prevent sliding of the sheath within the casing, said depressions being formed in those portions of the sheath which are thickened.

In testimony whereof I have signed my name to this specification in the presence of two subscribing witnesses.

JOSEPH C. WISE.

Witnesses:
E. E. LEIGHTON,
J. SHUTT.